United States Patent [19]

Wenzel et al.

[11] Patent Number: 4,709,000
[45] Date of Patent: Nov. 24, 1987

[54] ACRYLIC RESINS OF LOW HYGROSCOPICITY

[75] Inventors: Franz Wenzel, Darmstadt; Peter J. Arndt, Seeheim-Jugenheim; Werner Siol, Darmstadt-Eberstadt, all of Fed. Rep. of Germany

[73] Assignee: Röhm GmbH, Darmstadt, Fed. Rep. of Germany

[21] Appl. No.: 894,714

[22] Filed: Aug. 8, 1986

Related U.S. Application Data

[63] Continuation of Ser. No. 562,710, Dec. 19, 1983, abandoned.

[30] Foreign Application Priority Data

Dec. 30, 1982 [DE] Fed. Rep. of Germany ....... 3248602

[51] Int. Cl.$^4$ ............................................ C08F 270/68
[52] U.S. Cl. ..................... 526/320; 526/328; 526/328.5; 526/329.2; 526/326
[58] Field of Search ................ 526/320, 328, 325.5, 526/329.2, 326

[56] References Cited

U.S. PATENT DOCUMENTS

| | | | |
|---|---|---|---|
| 2,129,685 | 9/1938 | Graves | 526/326 |
| 2,477,293 | 7/1949 | Filachione et al. | 260/89.5 |
| 3,080,348 | 3/1963 | Lang et al. | 526/329.2 |
| 3,409,589 | 11/1968 | Kine | 526/320 |
| 3,466,269 | 9/1969 | Fivel | 526/329.2 |
| 3,489,712 | 1/1970 | Leveskis | 526/329.2 |
| 3,517,084 | 6/1970 | Tellier et al. | 526/329.2 |
| 3,629,197 | 12/1971 | Stiehl, Jr. | 526/320 |
| 3,697,490 | 10/1972 | Starmer | 526/320 |
| 3,812,067 | 5/1974 | Katsimbes et al. | 526/320 |
| 3,853,822 | 12/1974 | Brod et al. | 526/320 |
| 3,953,408 | 4/1976 | Hosoi et al. | 526/329.2 |
| 4,310,919 | 1/1982 | Slaten | 369/275 |

FOREIGN PATENT DOCUMENTS 90558 10/1983 European Pat. Off. .

OTHER PUBLICATIONS

Maron et al., *Principles of Physical Chemistry*, 4th Edn., MacMillan, New York, p. 102.
Hackh's Chemical Dictionary, 3rd Edition, p. 30, McGraw-Hill Book Company, Inc., New York.
Chem. Abstr. 89, 130345q (1978).

*Primary Examiner*—Joseph L. Schofer
*Assistant Examiner*—Bernard Lipman
*Attorney, Agent, or Firm*—Curtis, Morris & Safford

[57] ABSTRACT

Copolymers exhibiting low water absorption and having good optical and mechanical properties, suitable for use in making data storage disks containing optically readable information, said copolymer being at least ternary and comprising
(A) methyl methacrylate, and further comonomers selected from at least two of the groups
(B)

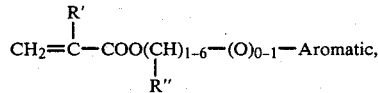

where R' is hydrogen or methyl and R" is hydrogen or alkyl, and
(C)

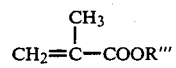

where R'" is aliphatic or alicyclic hydrocarbon, and
(D) styrene and/or alpha-methyl styrene.

9 Claims, No Drawings

ACRYLIC RESINS OF LOW HYGROSCOPICITY

This application is a continuation of application Ser. No. 562,710, filed Dec. 19, 1983, now abandoned.

The present invention relates to acrylic resins exhibiting low water absorption.

Acrylic resins may absorb water from a humid atmosphere or through other contact with water. The water absorption of acrylic glass substitutes depends on factors determined by the material (such as saturation, concentration and diffusion coefficient) as well as factors determined by the environment (geometry of the article involved, concentration and pressure of the moist medium, storage time, and temperature).

So far as the mechanical properties of acrylic resins are concerned, water has a certain plasticizing effect. Some loss in tensile and flexural strength as well as in modulus of elasticity occurs, whereas impact strength and bending angle are increased. However, in traditional processing technology, the influence of water on the physical properties of acrylic resins has been regarded as posing no particular problems. For example, in Vieweg-Esser, Kunstoff-Handbuch ["Plastics Handbook"], Volume IX, "Polymethacrylate" (Hanser-Verlag, 1975), it is stated on page 425:

"Since the water absorption of polymethyl methacrylate is relatively low, especially at temperatures under 100° C., by comparison with many other synthetic resins, such as polyamide or cellulose acetate, most changes in the physical properties of acrylic glass substitutes are within narrow limits which in actual use are often hardly perceptible."

In U.S. Pat. No. 2,477,293 from the year 1947, the polymers and copolymers of aryl and substituted aryl acrylates and methacrylates are said to possess fluidity, elasticity, plasticity, tensile strength, electrical resistance, resistance to water, organic liquids and gases, transparency, etc. However, the patent offers no teaching of practical value in this connection.

U.S. Pat. No. 2,129,685, issued in 1934, claims copolymers of phenyl esters of methacrylic acid and polymerizable derivatives of acrylic or methacrylic acid. Mention is further made of blends of polymethylmethacrylate (PMMA) and polymers or copolymers of phenyl esters of acrylic or methacrylic acid.

Solid copolymers comprising 1 to 25 percent by weight of alkoxyphenyl-methacrylates and -acrylates and monoethylenically unsaturated monomers such as methyl methacrylate, styrene, vinyl acetate, etc. are part of the teachings of U.S. Pat. No. 3,409,589.

Thermoplastic resins comprising 40 to 99 percent of polycarbonate and 1 to 60 percent of a vinyl copolymer formed from 60 to 98 percent of aromatic vinyl monomers, 2 to 40 percent of aralkyl or naphthyl acrylates or methacrylates, 0 to 3 percent of polyfunctional monomers, and 0 to 1 percent of allyl monomers are known from published Japanese patent application 78 34 853 (see Chem. Abstr. 89, 130345q).

By and large, the prior art acrylic resins have met the requirements imposed on them. Problems occasionally arise when water acts on relatively thin material in a nonuniform manner, as for example, in aquariums whose walls are too thin. Nonuniform water uptake by the material, or the development of a moisture gradient, may result in warping or buckling.

German patent publication 30 28 498 points to the problems which the development of a moisture gradient can create in the case of optically readable information storage disks made from PMMA. In that publication, these problems are solved by minimizing water absorption in the forming operation and in the subsequent processing steps.

The undesired effect of nonuniform water uptake by information storage disks (the so-called "umbrella effect") is also dealt with in U.S. Pat. No. 4,310,919, which seeks to solve the problem by making these disks completely symmetrical.

The solutions proposed are plainly directed toward prevention of the development of a moisture gradient or toward internal compensation for its effects.

Thus there has been a need for a material whose optical and mechanical properties satisfy the stringent requirements which information storage disks, and especially optically readable information storage disks, must meet and which does not give rise to the problems due to nonuniform water absorption, or in which these problems are not a factor.

This need is met by the acrylic resins of the present invention. The acrylic resins in accordance with the invention are polymers of at least three monomer groups (terpolymers), preferably with significant proportions of monomers containing aromatic groups. The proportions of the various monomer groups are chosen so that the structural order which is observed with aromatic monomer units, and which is due to the tendency of the aromatic group to associate, is largely suppressed.

More in particular, the synthetic resins of the present invention comprise at least three comonomers, namely methyl methacrylate and at least two further comonomers chosen from at least two different groups of monomers designated below as (B)–(D) and, optionally, further monomers of types (E) and/or (F) and/or (G). The monomer types and their percentages by weight in the polymer or in the monomer mixture from which the polymer is made are:

(A) 20–85 percent of methylmethacrylate;
(B) 0–50 percent of at least one monomer of the formula

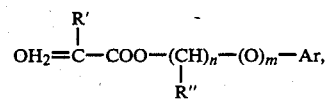

wherein R' is hydrogen or methyl, R" is hydrogen or alkyl having 1 to 7 carbon atoms, Ar is phenyl optionally substituted with alkyl having from 1 to 7 carbon atoms, n is an integer from 1 to 6, and m is 0 or 1, but n and m are not both 1;

(C) 0–60 percent of at least one monomer of the formula

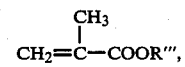

wherein R'" is linear or branched hydrocarbon having 2 to 20 carbon atoms or is a cyclic nonaromatic (i.e. alicyclic) hydrocarbon having up to 12 carbon atoms and at least 5 ring-carbon atoms;

(D) 0 to 40 percent of styrene and/or alpha-methyl styrene;

(E) 0 to 9.9 percent of 4-methylstyrene;

(F) further copolymerizable comonomers different from (A)–(E) whose solubility in water at 25° C. does not exceed 50 g/liter, and (G) still other copolymerizable monomers different from (A)–(F).

The acrylic resins of the present invention are distinguished by the fact that their water absorption under the conditions of DIN 50 015 does not exceed 1.0, and preferably 0.8, percent by weight.

Quite unexpectedly, the mechanical properties, and especially the optical properties, of the polymer system to be used in accordance with the invention satisfy even the exacting requirements which optically readable information storage disks must meet. This is true especially of their birefringence, which usually sharply limits the use of monomers containing aromatic groups, including styrene itself. Since the birefringence exhibited by test samples is largely determined by processing conditions, it should be noted that the copolymers of the invention, which are composed of at least three monomer groups, may be formulated so that these polymers can be used to produce formed articles by injection molding without the products having unduly high birefringence (for example, a value greater than 100 nm). Such molding compositions can also be extruded.

In selecting the comonomers from the aforementioned individual monomer groups, care should be taken to set the proportion of the monomers from groups (B) to (E) high enough for the polymer produced therefrom to have the desired low water absorption, for example, less than 1.0 percent. All monomers of groups (B) to (E) will contribute to a reduction in the water absorption of the methyl methacrylate polymer. As a rule, the monomers of groups (D) and (E) containing aromatic groups have the effect of sharply reducing the water absorption of the polymer. However, they should not be used in such an amount that the birefringence exceeds the desired value, for example 50 nm. In order to obtain polymers with the requisite low water absorption, further monomers, for example of type (C), should be copolymerized.

It has been found that in general the copolymerization of aromatic monomers such as styrene with two different comonomers, for example, comonomers of group (A) and of group (C), will yield polymers having less tendency to form birefringent structures than those resulting from copolymerization with methyl methacrylate [monomer group (A)] alone.

Thus, the terpolymers of the invention are generally distinguished not only by reduced water absorption but also by reduced birefringence in comparison with merely binary copolymers, for example of methyl methacrylate [group (A)] and styrene [group (D)] having an equal content of aromatic groups.

Moreover, the use of monomers of group (B) is of advantage. While these reduce the water absorption of the polymer, they lack the tendency, exhibited by styrene for example, to form birefringent structures.

However, the amount of these type (B) monomers should generally be less than 50, and more particularly less than 30, percent by weight of the total monomers. An upper limit is imposed on the amount of type (B) monomers mainly by the fact that these polymers will lower the glass transition temperature of the polymers. For this reason, particularly preferred members of monomer group (B) are the esters of methacrylic acid since these have a higher glass transition temperature than the esters of acrylic acid. 2-phenoxyethyl methacrylate, benzyl methacrylate, 2-phenylethyl methacrylate, 3-phenylpropyl methacrylate, and 1-phenylethyl methacrylate are especially suitable.

The use of larger amounts (for example, over 9.9 weight percent) of type (E) monomers (e.g. para-methylstyrene) is not part of the present invention since the use of these monomers is governed by special rules and relationships.

Suitable type (C) monomers are primarily those which will reduce the water absorption of the polymers without markedly lowering their glass transition temperature. These are those esters wherein $R'''$ is linear or branched hydrocarbon group having from 2 to 20 carbon atoms, or an alicyclic hydrocarbon having up to 12 carbon atoms and at least 5 ring carbon atoms. Isopropyl methacrylate, cyclohexyl methacrylate, the various butyl methacrylates, and n-propyl methacrylate are particularly suitable. As a rule, these monomers should not represent more than 60 weight percent of the total polymer.

The type (F) monomers which may be included should be different from types (A)–(E) and should have a solubility of less than 50 g of monomer per liter of water at 25° C. These monomers are selected from the group consisting of $\alpha$-olefins such as butadiene, isoprene and isobutylene, halogen containing olefins such as vinylidene chloride, esters of unsaturated dicarboxylic esters such as esters of itaconic, maleic and fumaric acids and particularly their methyl and ethyl esters and vinylesters of saturated carboxylic acids with three to eight carbon atoms in the acid portion. The type (F) monomers are added to improve mechanical properties of the resulting polymer in particular flexibility.

These monomers may be used in an amount from 0 to 30, and preferably from 0 to 10, percent by weight of the polymer.

In addition, small amounts (generally less than 10 weight percent) of monomers not named under (A)–(F), which enhance polymer cohesion may be optionally included as type (G) monomers. They are selected from the group consisting of acrylonitrile and methacrylonitrile and crosslinking monomers having in the molecule more than one group capable of polymerizing free radically, for example divinyl benzene, acrylic and methacrylic esters of polyols such as butandiol dimethacrylate, and moreover the vinyl-, allyl and crotylesters of acrylic and methacrylic acids. (See H. Rauch-Puntigam and T. Völker in "Acryl- und Methacrylverbindungen" ("Acrylic and Methacrylic Compounds"), Springer-Verlag, 1967, pp. 184–185).

The inclusion of comonomers adding to polymer cohesion is particularly favorable whenever the resulting polymer needs to be protected against organic solvents. The optional concurrent use of type (F) and type (G) monomers generally serves to improve the mechanical properties of the copolymers.

As a rule, the water absorption of the copolymers is best determined on the formed articles produced therefrom, for example, optical storage disks. However, to obtain data on the water absorption of the desired copolymers easily and quickly, the water absorption can be advantageously determined on a specimen having a high surface area, for example a ground bulk polymer or a bead polymer. The specimen is then first dried to constant weight (at 60° C. for 24 hours). The water absorption is determined simply as the gain in weight of the previously dried specimen. The measurements are made under standardized climatic conditions, in conformity with DIN 50 015 (humid) at 23° C. and 83% relative humidity after 24 hours of exposure, as such period of time will suffice to procure maximum gain in weight in any case. In practice it has been observed that a small sized sample (e.g. polymer beads) after 6 hours exposure has already attained its maximum gain in weight. After 24-hour storage under these standardized climatic conditions, the water absorption can additionally be determined by Karl Fischer titration. Weight gain and Karl Fischer values generally are in good agreement. (See also Table I.)

Birefringence is determined on a small injection molded plate about 1 mm thick, for example. The values given in Table I should be regarded as guide values since birefringence is known to depend in large measure on the processing technique.

However, it is apparent that changing from a binary copolymer to a terpolymer results in lower birefringence. For example, a copolymer of 20 parts of styrene and 80 parts of methyl methacrylate exhibits a birefringence of 126 nm, whereas the birefringence of a small injection molded plate produced under the same conditions and composed of 20 parts of styrene, 20 parts of cyclohexyl methacrylate, and 60 parts of methyl methacrylate is only 70 nm. The use of more than two different monomer units thus makes it possible to produce copolymers less capable of orientation, thereby hindering the formation of birefringent structures.

The polymers of the invention are suitable for a number of uses, especially where low water absorption coupled with low birefringence and good further optical properties as well as mechanical properties are required. As mentioned earlier, these requirements apply especially to storage media for information that is to be read optically, and more particularly to optical storage disks. For example, the birefringence of material of a thickness of 1 mm, for example, from which optical storage disks are to be made, should not exceed 100 nm. Particularly preferred are data-storage materials having a birefringence of less than 30 nm.

The polymers of the invention are well suited for the manufacture of such storage media, and particularly of optical storage disks. They lend themselves especially well to the manufacture of the optical digital disks used with the DOR (Digital Optical Recording) technique. The storage capacity of such disks usually is very high and may range from $10^9$ to $10^{11}$ bits, for example. Processing can be done conventionally, for example by casting or by the use of a molding composition. It is also possible to produce such information storage disks by extrusion or especially by injection molding. Moreover, these storage disks for optically read information can also be produced directly by polymerization of the monomer mixtures.

The monomer composition should be chosen so that the Vicat softening temperature (as determined in conformity with DIN 53 460) of the copolymers is above 70° C., and preferably above 80° C.

The polymers of the present invention are produced by free radical polymerization by conventional methods.

In principle, the polymerization of the comonomers of the invention from at least three classes of monomers can be carried out in bulk, in suspension, in emulsion, or in solution.

In suspension polymerization, the polymer solids can be isolated simply by filtering off the beads, followed by washing and drying. Recovery in emulsion polymerization is by precipitation, freeze coagulation, or spray drying, for example. In solution polymerization, the polymer solids can be separated by precipitation, for example in a nonsolvent such as methanol.

As a rule, polymerization is initiated by means of free radical initiators such as organic peroxides and peresters, such as dibenzoyl peroxide or tert-butyl-per-2-ethyl-hexaneoate, or with azo compounds such as azoisobutyronitrile, or with still other initiators. The polymerization temperature is based on the rate of decomposition of the initiator employed. For regulation of the molecular weight, such polymerization regulators as tert-dodecyl mercaptan, 2-ethylhexyl thioglycolate, etc., are generally used. Quite generally, the polymerization methods known to be used for methyl methacrylate and its copolymerization with other monomers can be employed. In this connection, reference is made also to Houben-Weyl, Methoden der Organischen Chemie ("Methods of Organic Chemistry"), 4th ed., vol 14/1.

For the production of molded articles to be used as storage media for optically readable information, the monomer mixtures of the invention, comprising monomers from at least three different groups, can be polymerized directly with the aid of an initiator and optionally of a redox component. It may be possible to start out from a monomer/polymer system. As a rule, however, the formed articles will be produced by injection molding, or else by extrusion, followed by the release of the formed article. In addition, formed articles can be produced by pressing. Thus the molding composition can be processed by various techniques. While the polymer should be readily processable, which calls for a low molecular weight, the degree of polymerization should not be below a certain minimum since otherwise the material would be too brittle. As a rule, molecular weights greater than 50,000, and more particularly greater than 70,000, are therefore required. However, especially when the compositions are used in extrusion or in injection molding, excessively high molecular weights ($>10^6$) should be guarded against as otherwise increased birefringence might be encountered. A minimum of light transmittance is essential particulary when the material is to be used to store optically readable information. That minimum depends, of course, on the type of light used to read the information. It follows that the basic material should have extremely low intrinsic absorption (self-absorption). As a general rule, the light transmittance of the material, as determined on a plate 3 mm thick, should be greater than 80 percent, and preferably greater than 90 percent. With regard to the measurement of light transmittance, reference is made to DIN 5036.

A better understanding of the present invention and of its many advantages will be had by referring to the following specific examples, given by way of illustration.

EXAMPLE 1

Polymerization in bead form

The data given in Houben-Weyl, Methoden der Organischen Chemie, 4th edition, volume 14/1, are applicable to the bead polymerization of monomer mixtures containing methyl methacrylate.

In addition to high molecular weight dispersing agents such as polyvinyl alcohol or sodium salts of styrene/maleic acid copolymers, powdered dispersing agents, for example aluminium hydroxide produced in situ, may be used. (c.f. Houben-Weyl, Volume 14/1, loc.cit., pp. 406–429).

In a batch of 1,000 ml of distilled water containing one of the above dispersing agents, a mixture of monomer, regulator, and initiator consisting of
300 g of methyl methacrylate,
100 g of 2-phenoxyethyl methacrylate,
50 g of cyclohexyl methacrylate,
50 g of styrene,
4 g 70% benzoyl peroxide, and
3 g of 2-ethylhexyl thioglycolate
is agitated for 3 hours at 80° C. to 85° C. Agitation then is continued for 2 hours at 90° C.

On completion of the polymerization, the batch is cooled and the bead polymer is washed with distilled water and dried. Free flowing, clear polymer beads are so obtained.

The water absorption of the polymer is advantageously determined directly on the beads.

For the production of injection molded plates, the beads are first granulated to a uniform particle size. A granulate of uniform particle size is also used in the production of extrudates. For a characterization of the polymer, see Table I below.

Vicat softening temperature: 85° C.

EXAMPLE 2

The procedure of Example 1 is used, but with a different monomer composition:
300 g of methyl methacrylate,
100 g of cyclohexyl methacrylate,
100 g of 3-phenylpropyl methacrylate,
4 g of 70% benzoyl peroxide, and
3 g of 2-ethylhexyl thioglycolate.

With regard to water absorption and birefringence of the injection molded plates, see Table I below. Vicat softening temperature: 84° C., light transmission (500–700 nm): >90% (Measurements being performed using sample of 3 mm thickness).

EXAMPLE 3

The procedure of Examples 1 and 2 is used but with a different monomer mixture:
375 g of methyl methacrylate,
100 g of 3-phenylpropyl methacrylate,
25 g of isobutyl methacrylate,
4 g of 70% benzoyl peroxide, and
3 g of 2-ethylhexyl thioglycolate.

Vicat softening temperature: 81° C., light transmission (500–700 nm): >90%.

EXAMPLE 4

The procedure of Examples 1 to 3 is used, except that the monomer composition is as specified below and the reaction time is 7 hours.
300 g of methyl methacrylat,
100 g of styrene,
100 g of cyclohexyl methacrylate,
5 g of 70% benzoyl peroxide, and
3 g of 2-ethyl thioglycolate.

Vicat softening point: 100° C., light transmission (500–700 nm): >85%.

EXAMPLE 5

(Comparative example)

The procedure of Example 4 is used, except that a merely binary monomer mixture is chosen:
400 g of methyl methacrylate,
100 g of styrene,
5 g of 70% benzoyl peroxide, and
3 g of 2-ethyl thioglycolate.

Free flowing, clear bead polymers are so obtained. The birefringence of the injection molded plates produced therefrom is significantly higher than the values exhibited by the polymers of Examples 1 to 4. (Cf. Table I.)

Vicat softening point: 96° C.

EXAMPLE 6

Bulk polymerization

Polymerization of the monomer mixture of Example 2 is carried out in bulk without the use of an aqueous dispersant system. The initiator used is a blend of lauroyl peroxide and benzoyl peroxide. Polymerization is carried out in the 60° C. to 90° C. temperature range.

The water absorption and birefringence of this bulk polymer correspond to the values obtained with the bead polymer of Example 2.

TABLE I

| Characterization of the polymers of Examples 1 to 5 | | | | | | | | |
|---|---|---|---|---|---|---|---|---|
| Polymer composition (wt. %) | | | | | | Water absorption[1] (%) | | Birefringence[4] (nm) |
| MMA | ST | CMA | IBMA | POEMA | PPMA | Grav.[2] | K.F.[3] | |
| 60 | 10 | 10 | — | 20 | — | 0.77 | 0.74 | 19 |
| 60 | — | 20 | — | — | 20 | 0.62 | 0.76 | 3 |
| 75 | — | — | 5 | — | 20 | 0.95 | 0.93 | 2 |
| 60 | 20 | 20 | — | — | — | 0.78 | 0.80 | 70 |
| 80 | 20 | — | — | — | — | 1.03 | 1.04 | 126 |

Methyl methacrylate
Styrene
Cyclohexyl methacrylate
Isobutyl methacrylate
Phenoxyethyl methacrylate
3-Phenylpropyl methacrylate
[1]Climatic conditions in conformity with DIN 50 015 (humid): 23° C., 83% relative humidity.
[2]Determined gravimetrially.
[3]Determined by the Karl Fischer method.
[4]Determined on an injection molded plate 1 mm thick.
[5]Comparative recipe comprising only two comonomers.

EXAMPLE 7

Bulk polymerization leading directly to a carrier for optically readable information A mixture of monomers of the following composition
39.8 percent styrene
39 percent cyclohexyl methacrylate 21 percent methyl methacrylate
0.2 percent butandiol dimethacrylate
is polymerized according to Example 6 using lauroyl peroxide and benzoyl peroxide as initiators directly to form a sheet of 1.5 mm thickness.

Vicat softening point: 97° C.
Birefringence (difference in optical paths): <3 nm.
Water absorption (climatic conditions in conformity with DIN 50 015 (humid): 23° C., 83% relative humidity: 0.3 percent.

What is claimed is:

1. An at least ternary acrylic copolymer exhibiting low water absorption and consisting essentially of
(A) 20 to 85 percent of methyl methacrylate;
(B) at least 10 percent of a monomer of the formula

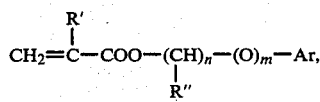

wherein
R' is hydrogen or methyl,
R" is hydrogen or alkyl having from 1 to 7 carbon atoms,
Ar is phenyl or phenyl substituted with alkyl having from 1 to 7 carbon atoms,
n is an integer from 1 to 6, and
m is 0 or 1, but n and m are not both 1;
(C) at least 10 percent of a monomer of the formula

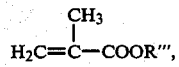

wherein
R''' is linear or branched hydrocarbon having from 2 to 20 carbon atoms, or alicyclic hydrocarbon having up to 12 carbon atoms and at least 5 ring carbon atoms;
(D) 0 to 40 percent of styrene or alpha-methyl styrene;
(E) 0 to 9.9 percent of 4-methylstyrene;
(F) 0 to 10 percent of a copolymerizable monomer, different from (A)-(E) whose solubility in water is less than 50 g per liter at 25° C. and which is an alpha-olefin, a halogenated olefin, an ester of an unsaturated dicarboxylic acid, or a vinyl ester of a $C_3$-$C_8$ carboxylic acid; and
(G) 0 to 10 percent of acrylonitrile, methacrylonitrile, or a crosslinking monomer having in its molecule more than one group capable of free radical polymerization,
all said percentages being by weight of said copolymer.

2. A copolymer as in claim 1 wherein monomer (B) is selected from the group consisting of 2-phenoxyethyl methacrylate, benzyl methacrylate, 2-phenylethyl methacrylate, and 3-phenylpropyl methacrylate.

3. A copolymer as in claim 1 wherein monomer (C) is cyclohexyl methacrylate.

4. An at least ternary acrylic copolymer exhibiting low water absorption and consisting essentially of
(A) 20 to 85 percent of methyl methacrylate;
(B) 0 to 50 percent of a monomer of the formula

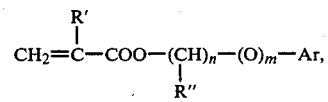

wherein
R' is hydrogen or methyl,
R" is hydrogen or alkyl having from 1 to 7 carbon atoms,
Ar is phenyl or phenyl substituted with alkyl having from 1 to 7 carbon atoms,
n is an integer from 1 to 6, and
m is 0 or 1, but n and m are not both 1;
(C) at least 10 percent of a monomer of the formula

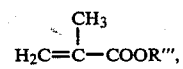

wherein
R''' is linear or branched hydrocarbon having from 2 to 20 carbon atoms, or alicyclic hydrocarbon having up to 12 carbon atoms and at least 5 ring carbon atoms;
(D) at least 5 percent of styrene or alpha-methyl styrene;
(E) 0 to 9.9 percent of 4-methylstyrene;
(F) 0 to 10 percent of a copolymerizable monomer, different from (A)-(E) whose solubility in water is less than 50 g per liter at 25° C. and which is an alpha-olefin, a halogenated olefin, an ester of an unsaturated dicarboxylic acid, or a vinyl ester of a $C_3$-$C_8$ carboxylic acid; and
(G) 0 to 10 percent of acrylonitrile, methacrylonitrile, or a crosslinking monomer having in its molecule more than one group capable of free radical polymerization,
all said percentages being by weight of said copolymer.

5. A copolymer as in claim 4 wherein monomer (B) is selected from the group consisting of 2-phenoxyethyl methacrylate, benzyl methacrylate, 2-phenylethyl methacrylate, and 3-phenylpropryl methacrylate.

6. A copolymer as in claim 4 wherein monomer (C) is cyclohexyl methacrylate.

7. An at least ternary acrylic copolymer exhibiting low water absorption and consisting essentially of
(A) 20 to 85 percent of methyl methacrylate;
(B) at least 5 percent of a monomer of the formula

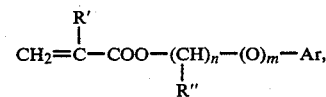

wherein
R' is hydrogen or methyl,
R" is hydrogen or alkyl having from 1 to 7 carbon atoms,
Ar is phenyl or phenyl substituted with alkyl having from 1 to 7 carbon atoms,
n is an integer from 1 to 6, and
m is 0 or 1, but n and m are not both 1;
(C) at least 5 percent of a monomer of the formula

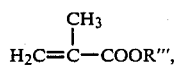

wherein
R''' is linear or branched hydrocarbon having from 2 to 20 carbon atoms, or alicyclic hydrocarbon having up to 12 carbon atoms and at least 5 ring carbon atoms;
(D) at least 5 percent of styrene or alpha-methyl styrene;
(E) 0 to 9.9 percent of 4-methylstyrene;
(F) 0 to 10 percent of a copolymerizable monomer, different from (A)–(E) whose solubility in water is less than 50 g per liter at 25° C. and which is an alpha-olefin, a halogenated olefin, an ester of an unsaturated dicarboxylic acid, or a vinyl ester of a $C_3$–$C_8$ carboxylic acid; and
(G) 0 to 10 percent of acrylonitrile, methacrylonitrile, or a crosslinking monomer having in its molecule more than one group capable of free radical polymerization,
all said percentages being by weight of said copolymer.

8. A copolymer as in claim 7 wherein monomer (B) is selected from the group consisting of 2-phenoxyethyl methacrylate, benzyl methacrylate, 2-phenylethyl methacrylate, and 3-phenylpropryl methacrylate.

9. A copolymer as in claim 7 wherein monomer (C) is cyclohexyl methacrylate.

* * * * *